United States Patent
Ciccone

[19]

[11] Patent Number: 6,101,831

[45] Date of Patent: Aug. 15, 2000

[54] PORTABLE EVAPORATIVE COOLER

[75] Inventor: Ted Ciccone, Phoenix, Ariz.

[73] Assignee: AdobeAir, Inc., Phoenix, Ariz.

[21] Appl. No.: 09/128,894

[22] Filed: Aug. 4, 1998

[51] Int. Cl.[7] ................................................. F28D 5/00

[52] U.S. Cl. ................................................ 62/310; 62/314

[58] Field of Search .............................. 62/304, 310, 314, 62/258

[56] References Cited

U.S. PATENT DOCUMENTS

| | | | |
|---|---|---|---|
| 2,966,046 | 12/1960 | Wright | 62/314 |
| 2,998,714 | 9/1961 | Bonzer | 62/314 |
| 4,615,182 | 10/1986 | Worthington | 62/310 |
| 4,798,060 | 1/1989 | Long et al. | 62/310 |
| 4,802,812 | 2/1989 | Simpson | 414/508 |
| 5,168,722 | 12/1992 | Brock | 62/304 |
| 5,606,868 | 3/1997 | Calvert | 62/315 |
| 5,857,350 | 1/1999 | Johnson et al. | 62/314 |

*Primary Examiner*—William Doerrler
*Attorney, Agent, or Firm*—Richard E. Oney

[57] ABSTRACT

A portable evaporative cooler is constructed from a housing having at least one opening fitted with an evaporative medium pad, and an exhaust vent. This cooler includes a pump for dispersing water over the evaporative medium pad, and a bottom pan for receiving the water, the pump cooperating with the bottom pan to permit water to recirculate. A fitting on the housing permits the cooler to be connected to a water source, the fitting including a valve (such as a float valve) for automatically filling the cooler when the water level in the bottom pan is below a predetermined level. An exhaust fan draws air into the housing through the evaporative medium pad and out the exhaust vent. Finally, the housing is fitted with a convenience device (such as a beverage server or tool tray).

19 Claims, 2 Drawing Sheets

PORTABLE EVAPORATIVE COOLER

The present invention relates to the field of evaporative coolers, and in particular to a portable evaporative cooler adapted especially for use in such applications as patios, workshops, garages, and other areas in which cooling is desirable, but in which cooling needs have not be addressed adequately in the past.

BACKGROUND OF THE INVENTION

Evaporative coolers are well known to the art. Such coolers rely upon the principle that hot, dry air forced through a medium that is saturated with water will release heat to evaporate some of that water, producing a stream of cooler, more humid air. Such coolers have existed for more than fifty years, and principally are used in desert and other semi-arid climates where the addition of humidity to the air is possible and desirable.

Typically, evaporative coolers are found in three basic forms. First are fixed cooling units that are typically mounted on the roof of a building to be cooled, with associated duct work associated with the cooler to vent cool, fresh air to the building. There also are window coolers that cool the area in which they are located. Finally, there are so-called portable units, which often are temporarily or permanently mounted in windows, to table-tops, or to other structures so that hot, dry air can be cooled directly in the rooms in which these coolers are operating.

Because these three types of coolers require that the cooling unit be mounted permanently or temporarily, they have not often been used to cool spaces that are not frequented by the operator, or spaces where cooling is desired only for short periods of time. For that reason, a cooler that is truly and conveniently portable, in that it can be moved readily from one location to another without the need for even temporary mounting, has been desired by the trade and by consumers.

The requirements for such a cooler are several. First, the cooler must be rugged to withstand frequent movement from room to room as it is moved during use. Second, the cooler must be capable of being used both indoors and outdoors, because certain environments in which it may be operated are exposed to the elements. Third, because the cooler will not be connected to a fixed water source, the cooler should be capable of being filled at remote sites, such as by a garden hose, and preferably refilled without the need for action by the operator. Finally, because the cooler will not be mounted in a window or other location that is out of the way of furniture, tool benches, or other similar provisions found in the spaces where the cooler will be used, it must not by its size and operation compromise the spaces in which it will operate, or inconvenience the operator of the cooler.

SUMMARY OF THE INVENTION

The present invention is found in a cooler that meets such needs for indoor and outdoor use, portability, and efficiently movement while economizing space requirements. Thus, the invention comprises a portable evaporative cooler constructed from a housing having at least one opening fitted with an evaporative medium pad, and an exhaust vent. This cooler includes a pump for dispersing water over the evaporative medium pad, and a bottom pan reservoir for receiving the water, the pump cooperating with the bottom pan to permit water to recirculate. A fitting on the housing permits the cooler to be connected to a water source, the fitting including a valve (such as a float valve) for automatically filling the cooler when the water level in the bottom pan is below a predetermined level. An exhaust fan draws air into the housing through the evaporative medium pad and out the exhaust vent. Finally, the housing is fitted with a convenience device (such as a beverage server or tool tray).

It is an object of the invention to provide a rugged cooler that can withstand frequent movement from one location to another.

It is another object of the invention to provide a cooler that can be used both indoors and outdoors.

Still another object of the invention is to provide an evaporative cooler that is capable of being filled at remote sites, and refilled without the need for action by the cooler operator.

A further object of the invention is to provide a cooler that incorporates a tool tray, beverage server, or other similar apparatus to enable the cooler to be used without compromising the spaces in which the cooler will operate, and to convenience the operator of the cooler.

These and other objects of the invention are explained more fully below.

DETAILED DESCRIPTION OF AN EMBODIMENT OF THE INVENTION

Figure 1:
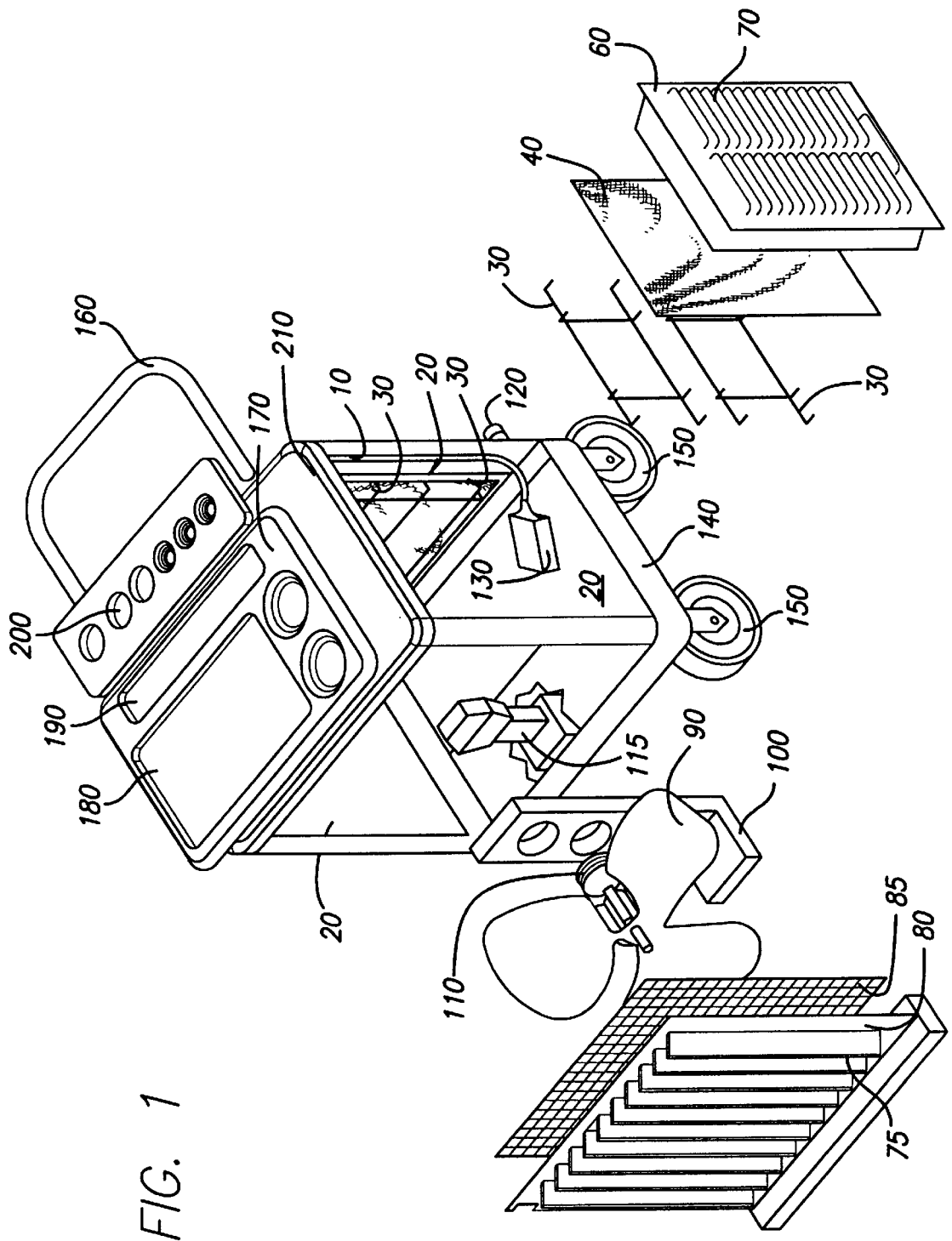
FIG. 1 is an exploded view of an embodiment of the cooler of the present invention, in which the convenience device that is part of the invention takes the form of a tool tray.

As shown in FIG. 1, the invention comprises a housing 10 containing a plurality of apertures 20 through which air can pass. Each aperture 20 is fitted with at least one means 30, such as wire racks, for retaining evaporative medium pads 40. The retaining means are mounted to the frame so that the pads 40, such as a conventional aspen or synthetic pad, can be retained in placed along the periphery of the cooler and so that the medium does not fall into the central cavity of the cooler. A vent 60, such as that shown in FIG. 1 incorporating louvers 70, is removably mounted external of pads 40 so that the pads can be replaced when they become spoiled.

One of apertures 20 is fitted with an air exhaust vent 80 rather than a pad 40 and vent 60 to permit air to flow though the vents 60 and pads 40 into the cooler by operation of the exhaust fan (or blower) 90. Fan 90 is attached to the cooler by support 100, and is operated by motor 110. A screen 85 is preferably included between vent 80 and the fan/motor combination to prevent the operator's fingers from touching the fan. Louvers 75 are included in vent 80 to allow for deflection of the air.

Still referring to FIG. 1, the base of housing 10 includes a bottom pan 140 that holds the water that is used in the cooling process. Water is distributed downward by gravity over the pads 40 by pump 115, which recirculates water from the bottom pan to the top of the cooler housing (by conventional water distribution means not shown in the figures but well-understood in the art) and discharges the water over the pads 40. Water drains over the pads 40, saturating them to permit evaporative cooling to occur. A fitting 120 is provided to permit the cooler to be filled from conventional water sources at locations that are potential remote from the site where the cooler will be used. For example, the fitting 120 may be adapted to connect to a garden hose. A float operated valve 130 is preferably associated with fitting 120 to permit the cooler to be filled automatically when it is connected to a water source, such as a garden hose, and to stop filling the cooler when the desired water level is reached in the bottom pan 140.

To permit the cooler to be transported conveniently and efficiently, the cooler preferably includes means for moving the cooler, such as casters 150, which are mounted to the housing 10. Alternatively, the casters could be part of a separate cart associated with and adapted to securely receive the housing. A handle 160 attached to the housing 10 also is preferably provided to permit easy transportation of the cooler.

Figure 2:
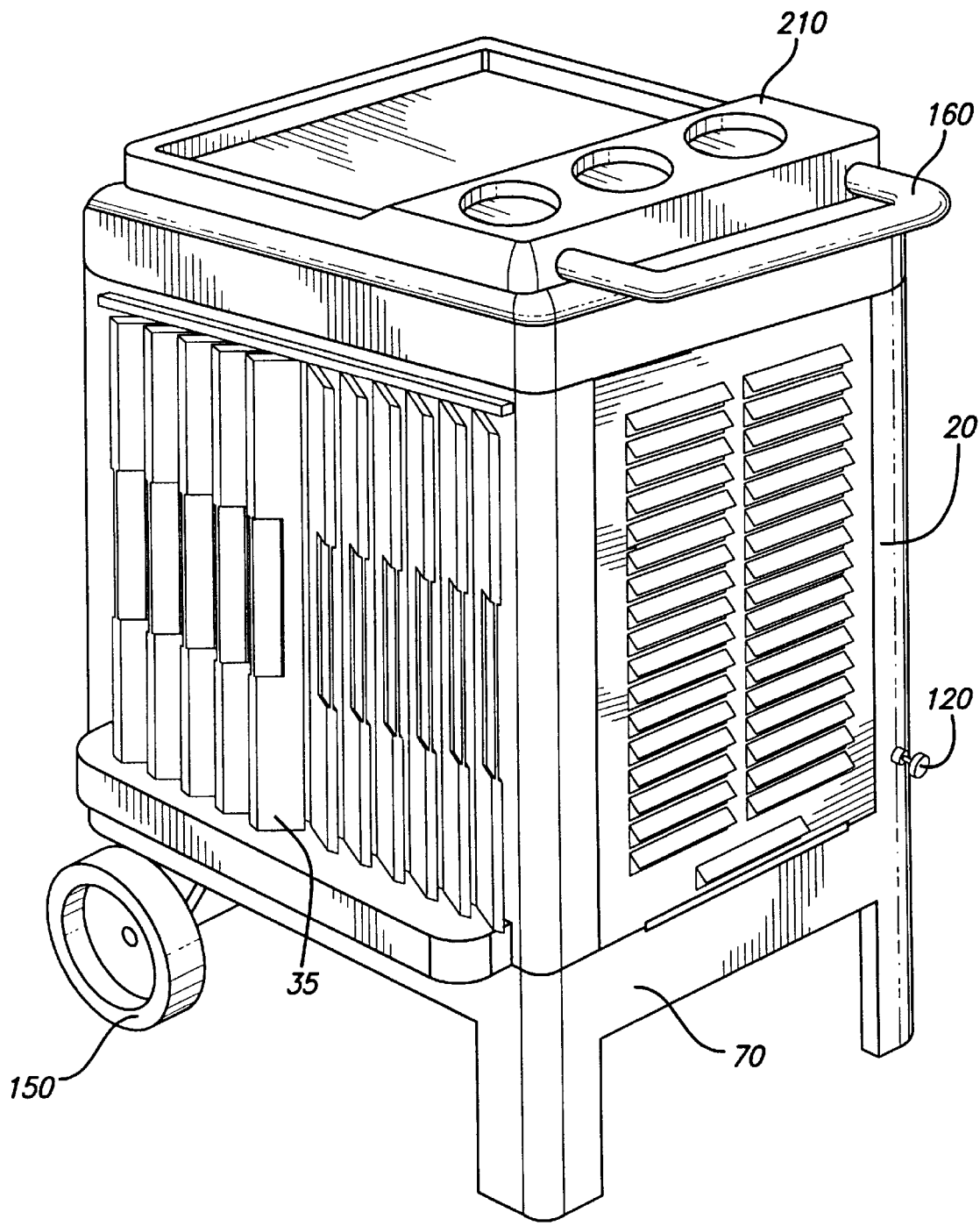
FIG. 2 is a perspective view of the cooler of the invention constructed with an alternative convenience device, namely, a beverage server.

The cooler of the present invention also includes a convenience device that permits the cooler to be used in spaces such as workshops, patios, garages, etc., without taking up space that otherwise would be used for tool trays, work benches, table-top beverage service, and the like. Thus, as shown in FIG. 1, the cooler may include a tool tray 180 as the convenience device, which tray includes at least one repository 190, 200 for tools, screws, nails, etc. An alternative convenience device, designed for use as a beverage server 210. is shown in FIG. 2. Of course, the convenience device may take any form suitable for an intended use without departing from the invention. Likewise, the convenience device 180 may be constructed of any material suitable for the intended use of the device, such as plastic, wood or metal. The convenience device may be removable from the housing, which may be desired for cleaning, or fixed to or made integral with the housing.

The cooler housing 10 is preferably constructed of rugged, weather-resistant material, such as epoxy-coated or water-resistant painted metal, or high-impact plastic. Likewise, other departures from conventional evaporative coolers, such as the use of metal rather than plastic fan blades, the use of heavier-duty, weather-resistant power cords, the use of safety plugs and cord wraps or reels, are preferred to render the cooler made according to the invention suitable to a variety of operating conditions.

The invention described and claimed herein is not limited to an embodiment that incorporates all of the features that have been mentioned. Indeed, the present invention has been described with respect to certain embodiments and conditions which are not meant to and should not be construed to limit the scope of the invention. Those skilled in the art will understand that variations from the embodiment and conditions described herein may be made without departing from the invention as defined in the appended claims.

What is claimed is:

1. A portable evaporative cooler comprising:

a housing having at least one opening fitted with an evaporative medium pad, and an exhaust vent;

a pump for dispersing water over the evaporative medium pad;

a bottom pan for receiving the water, the pump cooperating with the bottom pan to permit water to recirculate;

an exhaust fan for drawing air into the housing through the evaporative medium pad and out the exhaust vent; and a convenience device fitted to the housing, the convenience device including a tool tray.

2. The cooler of claim 1, wherein the convenience device further includes a beverage server.

3. The cooler of claim 1, wherein the housing is fitted with means for moving the cooler.

4. The cooler of claim 3, wherein the means for moving the coolers comprises a plurality of casters.

5. The cooler of claim 1, wherein the housing is fitted with a handle.

6. The cooler of claim 1, further comprising a fitting in the housing to permit the cooler to be connected to a water source.

7. The cooler of claim 6, further including a valve means for automatically filling the cooler when the water level in the bottom pan is below a predetermined level.

8. The cooler of claim 7, wherein the valve means is a float-operated valve.

9. The cooler of claim 1, wherein the convenience device is removable from the housing.

10. The cooler of claim 1, wherein the convenience device is integral to the housing.

11. The cooler of claim 1 wherein the convenience device includes at least one repository adapted for holding work materials.

12. A portable evaporative cooler comprising:

a housing having an exhaust vent, and at least one opening fitted with an evaporative medium pad;

a pump for dispersing water over the evaporative medium pad;

a bottom pan for receiving the water, the pump cooperating with the bottom pan to permit water to recirculate;

an exhaust fan for drawing air into the housing through the evaporative medium pad and out the exhaust vent; and a convenience device removably mounted to the housing.

13. The cooler of claim 12, wherein the convenience device is selected from the group of tool trays and beverage servers.

14. The cooler of claim 12 wherein the convenience device includes at least one repository adapted for receiving one or more tools.

15. The cooler of claim 12 wherein the convenience device includes at least one repository adapted for holding work materials.

16. The cooler of claim 12 wherein the convenience device includes at least one repository adapted for receiving a beverage container.

17. The cooler of claim 12, wherein the housing is fitted with a plurality of casters and a handle adapted to permit easy transportation of the cooler in cooperation with the casters.

18. The cooler of claim 12, further comprising a fitting in the housing to permit the cooler to be connected to a water source.

19. The cooler of claim 18, wherein the fitting includes a valve means for automatically filling the cooler when the water level in the bottom pan is below a predetermined level.

* * * * *